United States Patent

[11] 3,580,346

| [72] | Inventor | Terrence F. McLaren<br>5104 W. 105th place, Oak Lawn, Ill. 60453 |
|---|---|---|
| [21] | Appl. No. | 820,364 |
| [22] | Filed | Apr. 30, 1969 |
| [45] | Patented | May 25, 1971 |

[54] TRUCK
3 Claims, 5 Drawing Figs.

[52] U.S. Cl. .................................................. 180/19,
214/384, 280/47.24
[51] Int. Cl. ...................................................... B62d 51/04,
B62b 1/06
[50] Field of Search .......................................... 180/19;
280/47.29, 47.24; 214/384; 248/243

[56] References Cited
UNITED STATES PATENTS
2,814,402  11/1957  Schaefer........................ 280/47.29X 3,205,963  9/1965  Tinker.......................... 180/19

FOREIGN PATENTS
469,679  5/1914  France ......................... 248/243
894,253  4/1962  Great Britain................ 280/47.29

*Primary Examiner*—Benjamin Hersh
*Assistant Examiner*—John A. Pekar
*Attorney*—Stone, Zummer & Livingston

ABSTRACT: A truck which is particularly adapted for use in hauling a bundle of bricks at a construction site. The truck includes a flatbed to which is connected a pair of wheels. The flatbed has a plurality of pairs of spaced apertures, and a pair of cantilever arms is mounted in a selected pair of spaced apertures. The arms may be readily inserted into open spaces in a bundle of bricks to support the bricks on the flatbed for hauling the bundle of bricks.

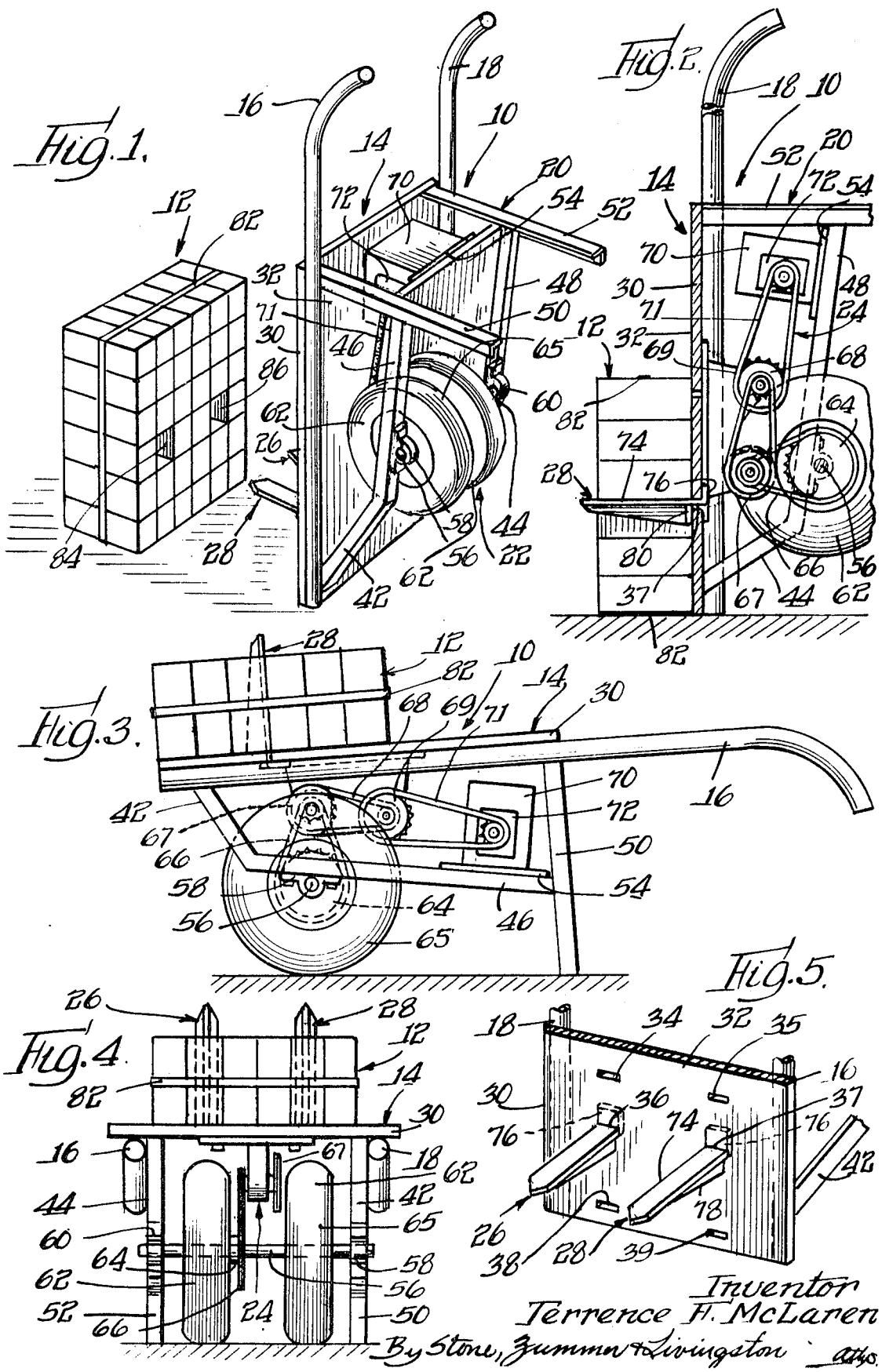

TRUCK

BACKGROUND OF THE INVENTION

In construction work wherein bricks are to be used, traditionally the bricks have been delivered by a dray in a loose form, and the bricks are then stacked in a given location. As the bricks are needed, the bricks are hauled to the part of the construction site where the bricks are needed. Customarily, the bricks are thrown into a wheelbarrow and wheeled to the location where the bricklayers are laying the brick. The handling of the bricks, that is, from the the dray to the stack, from the stack to the wheelbarrow, and then from the wheelbarrow to the bricklayers, involves a substantial amount of labor in that each brick must be handled individually.

Brick manufacturers have recognized that handling of individual bricks is inefficient, and to make use of the power equipment which is available, many brick manufacturers tie bricks into bundles with steel strapping. The bundles have open spaces so that a forklift truck may insert its fork into the bundle of bricks and manipulate the bricks about the brickyard and load a dray without the handling of each individual brick. The bricks are customarily delivered to a construction site still strapped into bundles.

At a construction site, a contractor usually does not have a forklift truck available for numerous reasons. One is that the cost of a forklift truck is substantial, and it is not economical to tie up the investment of a forklift truck at a small construction job when the use of the forklift truck may be quite limited. Furthermore, most construction sites do not have smooth ground surfaces because the excavations which normally accompany a construction leave the ground in an uneven condition, and the leveling is not performed until the construction is completed. Thus, the contractor is left with bundles of bricks which are usually broken open, and the bricks are individually placed into a wheelbarrow. In handling the bricks, often the bricks are chipped or even broken, so that there is material loss to the contractor.

SUMMARY OF THE INVENTION

The present invention relates to an improved truck construction which is economical to manufacture and easy to maintain, but which truck may be utilized on a construction site for hauling a bundle of bricks to appropriate locations on the construction site. The present invention provides a truck which has two wheels and a flatbed. The flatbed has a pair of arms removably mounted thereon, which arms extend substantially perpendicular to the flatbed. The flatbed has a pair of arms removably mounted thereon, which arms extend substantially perpendicular to the flatbed. The arms are spaced so that the arms may be easily placed in openings in a bundle of bricks. Thus, the arms, after being positioned in the openings, provide a support for the bundle of bricks, as does the flatbed. The bundle of bricks held onto the truck then may be conveniently driven to an appropriate location, thereby eliminating the necessity of handling the bricks individually, and, furthermore, reducing the likelihood of damage to the bricks by the handling of the bricks.

The present invention is directed to a specific truck construction in which the truck includes a flatbed upon which the bundle of bricks is supported. Two wheels are moveably connected to the flatbed and are powered by a motor. The flatbed has a pair of spaced openings into which are mounted cantilever arms, which cantilever arms are substantially perpendicular to the flatbed so that the bundle of bricks may be conveniently raised onto the flatbed, and the arms hold the bundle of bricks on the flatbed.

A BRIEF DESCRIPTION OF THE DRAWING

FIG. 1 is a perspective view showing a bundle of bricks and a truck embodying the herein-disclosed invention;

FIG. 2 is a side elevation of the truck shown in FIG. 1 with a cross-sectional view through a portion of the flatbed and also showing the bundle of bricks in engagement with the arm in the flatbed;

FIG. 3 is a side elevational view showing the truck loaded with a bundle of bricks and being in a generally horizontal position;

FIG. 4 is a front-end view of the truck and bundle of bricks shown in FIG. 3; and FIG. 5 is a perspective view of a portion of the truck shown in FIG. 1 showing the arms mounted in position.

DESCRIPTION OF THE PREFERRED EMBODIMENT

Referring now to the drawing, a specific embodiment of the herein-disclosed invention is shown therein. FIG. 1 shows a two-wheel motorized truck, generally indicated by numeral 10, and embodying the present invention, and the truck is juxtaposed a bundle of bricks. FIG. 2 shows the bundle of bricks in a loading or unloading arrangement, and FIG. 3 shows the bundle of bricks in a carrying attitude.

The truck 10 generally consists of a flatbed 14, a pair of reinforcing handles 16 and 18, an underframe 20, which is connected to the flatbed, a wheel assembly 22, which is mounted on the underframe, a drive assembly 24, which is mounted on the underframe and drivingly connected to the wheel assembly. The truck also includes a pair of identical cantilever arms 26 and 28, which are removably mounted on the flatbed and extend substantially perpendicular from one surface of the flatbed as may be best seen in FIGS. 2 and 5.

The flatbed 14 generally includes a rectangular metal frame 30, with a steel floor 32 fixed to the frame 30. The steel floor 32 has a pair of slots 34 and 35, adjacent to one end, a second pair of slots 36 and 37, adjacent to the same end, and a third pair of slots 38 and 39 adjacent to the edge of said end, as may be seen in FIG. 5. The distance between the slots in each pair is substantially equal to the distance between the openings in a bundle of bricks for reasons which are set forth in detail hereinafter.

The handles 16 and 18 are fixed to the flatbed. The handles extend substantially the entire length of the bed, and have the outermost ends curved to provide a convenient means for holding the handles and manipulating the truck. The handles thus also serve as a reinforcement for the bed when the truck 10 is in operation.

Mounted on the bottom of the bed is the underframe 20. The underframe 20 includes a pair of identical front braces 42 and 44, which have connected side beams 46 and 48, respectively. Fixed to the side beams 46 and 48 are legs 50 and 52, respectively, which legs provide a vertical support for the truck when the truck is in a substantially horizontal position, as shown in FIG. 3. A motor platform 54 is connected to the side beams 46 and 48, as may be seen in FIG. 2. The motor platform provides the dual function of supporting a portion of the drive assembly as well as providing a brace between the side beams 46 and 48.

The wheel assembly 22 includes an axle 56, which is fixed between a pair of blocks 58 and 60, which blocks are mounted on side beams 46 and 48, respectively. Rotatably mounted on the axle 56 is a wheel 62, which has fixed thereto a wheel sprocket 64. A second wheel 65 is freely rotatably mounted on axle 56 and is spaced from wheel 62, as may be best seen in FIG. 4. The two wheels 62 and 65 provide for a stable truck when the truck is loaded with a bundle of bricks. The wheel sprocket 64 is drivingly connected to the drive assembly 24.

The drive assembly 24 includes a wheel chain 66, which drivingly engages the wheel sprocket 64 and is drivingly connected to a wheel sprocket set 67, which is mounted on the flatbed. A drive chain 68 is drivingly connected to the wheel sprocket set and an engine sprocket set 69 which is also mounted on the flatbed. A conventional internal combustion engine 70 is mounted on the motor platform 54, and the engine 70 is drivingly connected to the engine sprocket set 69 through an engine chain 71 and a conventional clutch 72. The control for the drive assembly is conventional, and is not shown herein, nor are the details of the internal combustion engine shown in view of the fact that the parts are conventional and well known to those skilled in the art. The control for the drive assembly is conveniently located so that an operator may conveniently control the drive to the wheel 62.

As may be best seen in FIGS. 2 and 5, the cantilever arms 26 and 28 are identical in their construction. The cantilever arm 28 includes a pointed support plate 74, which support plate is substantially flat on one surface, and a lock flange 76, which is formed integral with one end of the support plate, which lock flange is perpendicular to the support plate. A brace plate 78 is tapered from the pointed end of the support plate 74 and is fixed to the support plate. A backplate 80 is fixed to the brace plate, and the support plate rests against the upper or outer surface of the flatbed. The distance between the plane of the lock flange 76 and the plane of the backplate 80 is substantially equal to the thickness of the floor 32 of the flatbed, as may be best seen in FIG. 2.

The cantilever arms 26 and 28 are attached to the flatbed by inserting the respective lock flange 76 through an appropriate aperture, with the surface of the support plate 76 substantially parallel to the surface of the floor 32. The cantilever arm is then rotated approximately 90° so that the backplate engages the upper or outer surface of the floor, and the lock flange engages the inner or lower surface of the floor. Thus, the cantilever arms are securely held in position. It is apparent that when the cantilever arms are placed in the selected apertures, they are spaced so that the arms are mateable with the openings in the bundle of bricks.

A bundle of bricks, such as bundle 12, includes a plurality of bricks held together by a metal strap 82, and in the bundle, there are two spaced openings 84 and 86. In order to manipulate the bundle of bricks 12, the cantilever arms 26 and 28 are placed in appropriate slots, thereby selecting the proper height for the support plate. The truck 10 is then tilted so that the flatbed 14 is substantially perpendicular to a surface of the bundle of bricks having the openings, and the cantilever arms are positioned in the openings 84 and 86, as shown in FIG. 2. The truck is then tilted back so that the bundle of bricks rests on the flatbed and is held in position by the cantilever arms. The truck may be placed into a substantially horizontal attitude, as is shown in FIG. 3. Wheel 62 is drivingly connected to the engine 70 to provide a power source to the wheel, and the bundle of bricks then may be easily and conveniently moved to a selected location where the bundle 12 is unloaded by simply tilting the truck.

From the foregoing description, it is readily apparent that after bundles of bricks have been unloaded from a dray and stacked in a location, the bundles may be conveniently manipulated at a construction site by use of the instant truck. It should further be noted that the bricks are handled in bundles so that the bricks need not be handled individually, and the bundles are delivered intact to a location where the bricks will be utilized, where the bundles are opened by cutting the strap 82. Thus, there is less of a likelihood of bricks being chipped or broken in handling.

Although a specific embodiment of the present invention has been shown and described in detail above, it is readily apparent that those skilled in the art may make various modifications and changes in the specific embodiment of the subject invention without departing from the scope thereof.

I claim:

1. A truck comprising, in combination, a flatbed, an underframe connected to one side of said flatbed, a pair of spaced wheels connected to said underframe, drive means drivingly connected to one of said wheels to provide a source of power to said wheel, a pair of substantially parallel handles connected to said flatbed and extending over substantially the entire length of said flatbed and extending from one end of said bed to provide a convenient means for manipulating said truck, said underframe including support means for supporting the flatbed in a substantially horizontal attitude, said flatbed having a pair of spaced apertures, said spaced apertures being spaced a distance substantially equal to the openings in a bundle of bricks, said flatbed having a second pair of spaced apertures positioned above the first-mentioned pair of spaced apertures and being the same distance as the first pair of spaced apertures, and a pair of cantilever arms removably mounted in one of said pairs of spaced apertures, each of said cantilever arms including a support plate, a lock flange formed integral with the support plate, said support plate being substantially perpendicular to the lock flange, said lock flange being engageable with the side of the flatbed adjacent to the underframe, said support plate being substantially perpendicular to the side of the flatbed opposite the side engageable with the lock flange, and a backplate fixedly connected to the support plate and being substantially parallel to the lock flange, said backplate being engageable with the side of the flatbed opposite to the side engageable with the lock flange, said backplate defining a plane, and said lock flange also defining a plane and the distance between said planes being substantially equal to the thickness of the flatbed.

2. A truck comprising, in combination, a flatbed, a wheel mounted on the flatbed, said flatbed having a pair of spaced apertures, and a cantilever arm removably mounted in each of said spaced apertures and extending outward from the flatbed, each cantilever arm includes a support plate and a lock flange formed integral with the support plate, said lock flange is substantially perpendicular to the support plate, said lock flange being engageable with the side of the flatbed opposite the side from which the arm extends, and a backplate fixedly connected to the support plate and being substantially parallel to the lock flange, said backplate being engageable with the side of the flatbed from which the arm extends, said backplate defining a plane, the lock flange also defining a plane and the distance between said planes being substantially equal to the thickness of the flatbed.

3. A truck as defined in claim 2, including a frame and a motor mounted on said frame and being drivingly connected to the wheel.

PO-1050
(5/69)

UNITED STATES PATENT OFFICE
CERTIFICATE OF CORRECTION

Patent No. 3,580,346          Dated May 25, 1971

Inventor(s) Terrence F. McLaren

It is certified that error appears in the above-identified patent and that said Letters Patent are hereby corrected as shown below:

In the Abstract, Line 7, after "the" insert --bundle of--.

Column 1, Line 48, cancel "The flatbed has a pair".

Column 1, Line 49, cancel "of arms removably mounted thereon, which arms extend sub-".

Column 1, Line 50, cancel "stantially perpendicular to the flatbed."

Signed and sealed this 23rd day of November 1971.

(SEAL)
Attest:

EDWARD M. FLETCHER, JR.          ROBERT GOTTSCHALK
Attesting Officer                Acting Commissioner of Patents